(12) United States Patent
Kim

(10) Patent No.: US 9,222,542 B2
(45) Date of Patent: Dec. 29, 2015

(54) ENGINE-MOUNT

(71) Applicant: Hyundai Motor Company, Seoul (KR)

(72) Inventor: Seung-Won Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 84 days.

(21) Appl. No.: 14/109,265

(22) Filed: Dec. 17, 2013

(65) Prior Publication Data

US 2015/0014905 A1    Jan. 15, 2015

(30) Foreign Application Priority Data

Jul. 12, 2013 (KR) ........................ 10-2013-0081960

(51) Int. Cl.
*F16F 5/00* (2006.01)
*F16F 13/10* (2006.01)
*F16F 13/20* (2006.01)

(52) U.S. Cl.
CPC .................. *F16F 13/10* (2013.01); *F16F 13/20* (2013.01)

(58) Field of Classification Search
CPC ......... F16F 13/10; F16F 13/08; F16F 13/102; F16F 13/105; F16F 13/24; F16F 3/0873; F16F 13/20
USPC ............. 267/140.13, 140.11, 140.14, 140.15, 267/219; 248/562, 636, 638
See application file for complete search history.

(56) References Cited

U.S. PATENT DOCUMENTS

| 5,246,212 A * | 9/1993 | Funahashi et al. | 267/140.13 |
| 5,344,127 A * | 9/1994 | Hettler et al. | 267/140.13 |
| 6,244,578 B1 * | 6/2001 | Schwerdt | 267/140.13 |
| 6,439,554 B1 * | 8/2002 | Takashima et al. | 267/140.13 |
| 7,815,174 B2 * | 10/2010 | Ueki et al. | 267/140.13 |

FOREIGN PATENT DOCUMENTS

| JP | 09-004674 A | 1/1997 |
| JP | 2007-298081 A | 11/2007 |
| KR | 1020100011769 A | 2/2010 |

* cited by examiner

*Primary Examiner* — Pamela Rodriguez
(74) *Attorney, Agent, or Firm* — Morgan, Lewis & Bockius LLP

(57) ABSTRACT

An engine mount includes: an insulator arranged inside a housing and deformed elastically in accordance with a force applied to a core connected to an upper end thereof; a nozzle plate having a flow channel opened up/downward for hydro liquid and connected between a diaphragm connected to the housing and the insulator; and a piston partitioning an internal space between the insulator and the nozzle plate and connected to the core to move in accordance force applied to the core, wherein upper and lower liquid chambers are formed between the piston and the nozzle plate, and between the nozzle plate and the diaphragm, respectively, and an air chamber through which ambient air can enter/exit is formed between the piston and the insulator. Vibration produced over a wide frequency region can be dampened more effectively by using air and the hydro liquid as an operation liquid.

5 Claims, 4 Drawing Sheets

ENGINE-MOUNT

CROSS-REFERENCE TO RELATED APPLICATION

The present application claims priority of Korean Patent Application Number 10-2013-0081960 filed Jul. 12, 2013, the entire contents of which application is incorporated herein for all purposes by this reference.

BACKGROUND OF INVENTION

1. Field of Invention

The present disclosure relates to an engine-mount, and more particularly, to an engine mount provided with all of properties of an pneumatic mount and a hydro mount (liquid enveloped-type mount).

2. Description of Related Art

Generally, vibrations are produced structurally in an engine for a vehicle and are produced also due to an uneven road surface while a vehicle drives.

The vibrations are produced not due to only one factor but due to several factors and thus the vibrations are produced up-downward, left-rightward and front/rearward.

Furthermore, an engine for a vehicle is not separated from a vehicle body but is connected to a shift device and an air conditioning device, etc., and thus the vibrations produced from the engine affect entirely the vehicle.

Accordingly, the engine for a vehicle is installed to a frame of a vehicle body through an engine mount so as to dampen the vibrations produced from the engine.

Here, an pneumatic engine mount has a damping force using air entry and exit wherein it has relatively low loss coefficient (vibration damping performance is relatively low), but the loss coefficient exhibits evenly on a wide frequency region (vibrations on wider frequency band are dampened), and a liquid enveloped-engine mount (hydro mount) has a damping force using flow resistance of hydro liquid that is enveloped therein wherein it has relatively great loss coefficient (vibration damping performance is relatively high), but the loss coefficient exhibits on a narrow frequency region (vibrations on narrower frequency band are dampened), with respect to the engine mount In designing the liquid enveloped-engine mount of the two types of the engine mount, the engine mount has been developed to focus on dampening generally the vibration components having a frequency band region of 10-13 Hz even though there are a little differences depending on the characteristics of a vehicle, however, it has been developed for the frequency width exhibiting the loss coefficient to be wider than the frequency band region as described above, considering the frequency movement depending on a design deviation and the aging of the components including the engine mount.

However, a technology is necessary for improving to dampen vibration over the relative narrower frequency band region in a case of the liquid enveloped-engine mount, as described above.

Furthermore, a frequency of the vibration (T1 vibration or shake vibration) caused from air vibration of a tire, which is produced while a vehicle drives, is moved depending on a speed of a vehicle, producing a frequency with a great displacement. For example, when the speed of a vehicle is on 60 km/h section, a frequency of 7 Hz is produced, when the speed of a vehicle is on 100 km/h section, a frequency of 13 Hz is produced, and the speed of a vehicle is on 140 km/h section, a frequency of 18 Hz is produced wherein the frequency of the vibration is varied depending on the speed of a vehicle. However, when the vibration having a frequency of 13 Hz is produced by chance on 100 km/h section, since the frequency is the same as the frequency with the loss coefficient of the liquid enveloped-engine mount, and the vibration with a great displacement can be dampened efficiently but its effect is minute at different speeds.

The information disclosed in this Background section is only for enhancement of understanding of the general background of the invention and should not be taken as an acknowledgement or any form of suggestion that this information forms the prior art already known to a person skilled in the art.

BRIEF SUMMARY

The present invention has been made in an effort to solve the above-described problems associated with the prior art. Various aspects of the present invention provide for an engine mount, in which a band region width of the vibration frequency that can be dampened exhibits more widely and the vibration induced from the air vibration of a tire can be dampened more efficiently.

Various aspects of the present invention provide for an engine mount including: an insulator that is arranged inside a housing and is deformed elastically in accordance with the force applied to a core which is connected to an upper end thereof; a nozzle plate in which a flow channel opened up/downward for the hydro liquid to be flowed is formed and which is connected between a diaphragm connected to a lower end of the housing and the insulator; and a piston that is arranged to partition the internal space between the insulator and the nozzle plate and is connected to the core to be moved in accordance with the force applied to the core, wherein an upper liquid chamber and a lower liquid chamber through which the enveloped hydro liquid flows are formed between the piston and the nozzle plate, and between the nozzle plate and the diaphragm, respectively, and an air chamber which is communicated to the outside through an air channel and through which air can enter/exit is formed between the piston and the insulator.

The piston may be made of metal material or synthetic resin and may be made of rigid body not to produce elastic deformation and be connected to the nozzle plate through an elastic member arranged on a lower end thereof and is moved in accordance with elastic deformation of the elastic member.

The flow channel formed through the nozzle plate may be formed in a ring shape along the surrounding of the nozzle plate, and have an upper hole communicated to the upper liquid chamber and a lower hole communicated to the lower liquid chamber wherein the upper hole is disposed to be opposite to the air channel, leaving the piston therebetween, and the air chamber may be formed by piercing a part of the insulator for internal and external sides to be communicated.

The piston may be formed to have an oblique surface wherein the internal heights from the nozzle plate are different from each other at one side and the other side and one part of the piston, having the higher height, is arranged to be directed toward the upper liquid chamber and the other part thereof, having the lower height, is arranged to be directed toward the air channel.

A membrane that is vibrated in accordance with the flow of the hydro liquid may be arranged on the nozzle plate to dampen more effectively the vibration produced over a specific frequency region, for example, an idle region.

The methods and apparatuses of the present invention have other features and advantages which will be apparent from or

Figure 1:
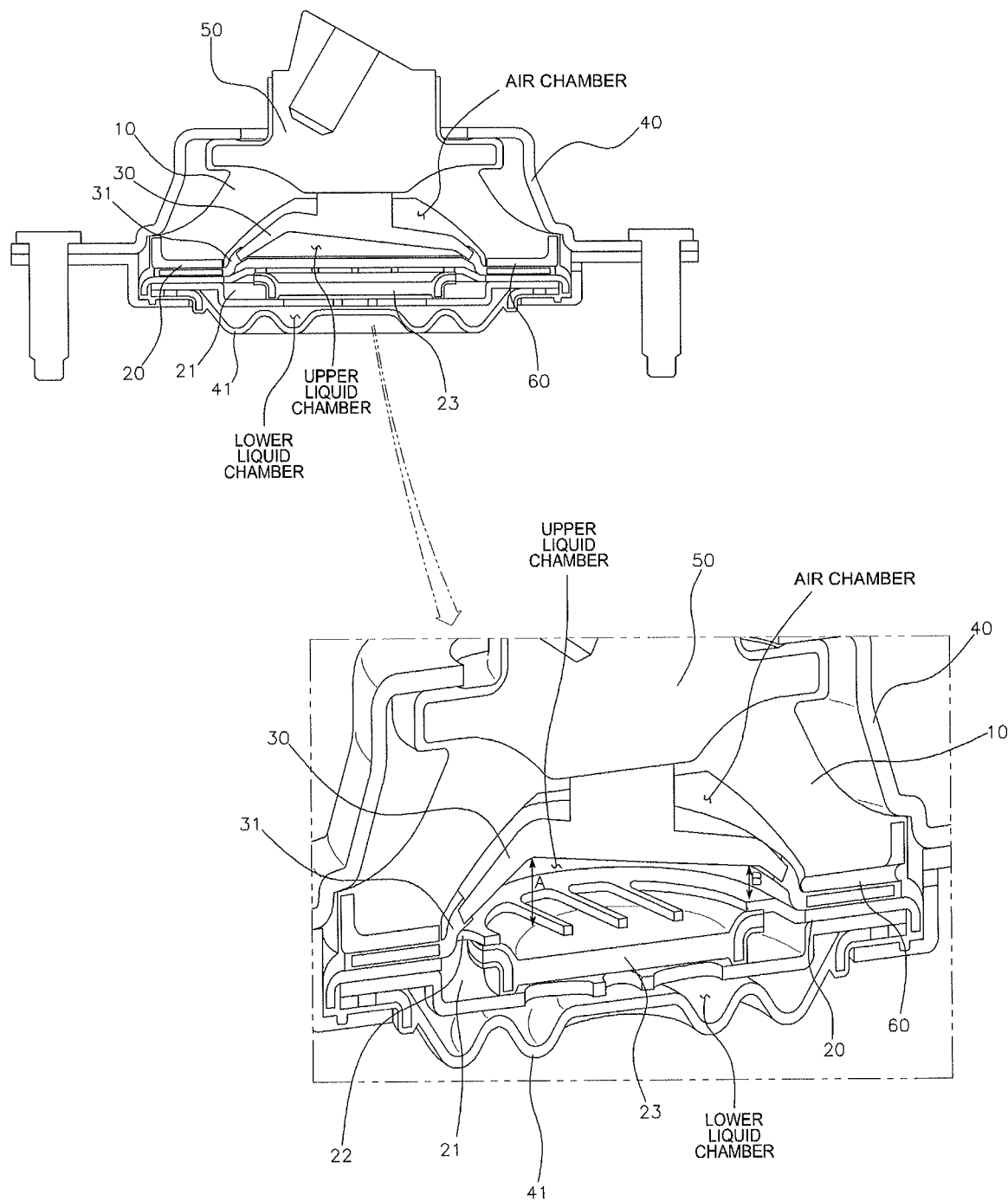
FIG. 1 is a front view and a partially enlarged view showing an exemplary engine mount cut in a longitudinal direction according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

An engine mount according to the present invention is configured such that a housing 40 is fixed to a vehicle body with bolts and an engine is mounted on a core 50 that protrudes to an upper end of the housing 40 to support weight of the engine wherein the vibration transferred from the engine in accordance with the flow of air and hydro liquid is dampened.

Figure 2:
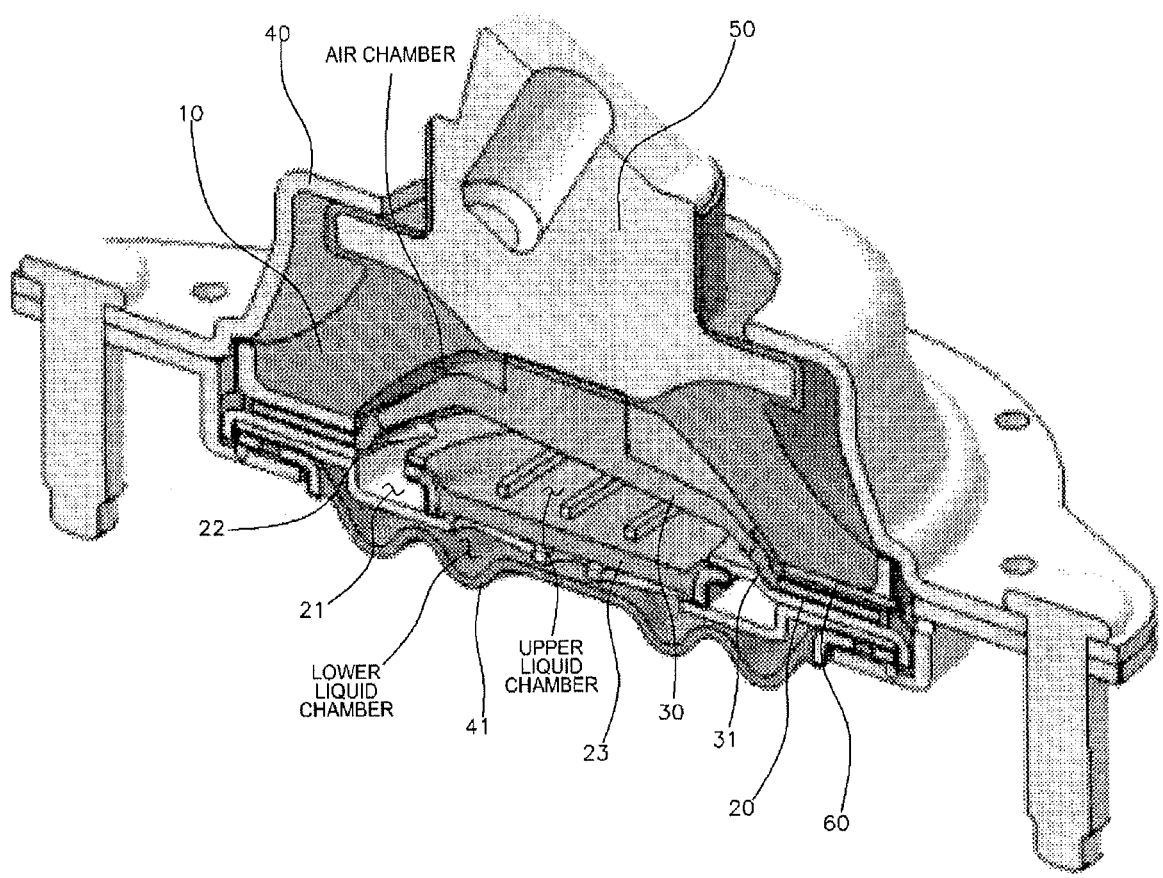
FIG. 2 is a perspective view showing an exemplary engine mount cut in a longitudinal direction according to the present invention.

FIG. 1 is a front view and a partially enlarged view showing an engine mount cut in a longitudinal direction according to various embodiments of the present invention and FIG. 2 is a perspective view showing an engine mount cut in a longitudinal direction according to various embodiments of the present invention.

Referring to FIGS. 1 and 2, an insulator 10 made of synthetic resin or rubber material to have a predetermined elasticity and configured to have a space in a predetermined size therebelow is arranged in a housing 40 of an engine mount according to the present invention wherein the insulator 10 is arranged while it is connected to a core 50 a part of which is protruded upward from the housing 40.

Furthermore, a nozzle plate 20, along a surrounding of which a flow channel 21 is opened up/downward for the hydro liquid to be flowed up/downward, is connected to below the insulator 10, and further a diaphragm 41 is arranged on a lower part of the housing 40 below the nozzle plate 20.

Meanwhile, a piston 30 is arranged on a space between the nozzle plate 20 and the insulator 10 through an elastic member 31 connected to the nozzle plate 20 to partition the inside of the space and is connected to the core 50 thereby to be moved in accordance with the force applied to the core 50.

As a result, an upper liquid chamber and a lower liquid chamber that are communicated through the flow channel 21 formed through the nozzle plate 20 are formed between the piston 30 and the nozzle plate 20, and between the nozzle plate 20 and the diaphragm 41, respectively. Here, an air chamber which is communicated to the outside through an air channel 60 formed by piercing a part of the insulator 10 or forming a gap between the insulator 10 and the nozzle plate 20, is formed between the piston 30 and the insulator 10, through which air can enter/exit.

Additionally, the hydro liquid of a predetermined amount is enveloped between the upper liquid chamber and the lower liquid chamber such that the hydro liquid is flowed through the upper liquid chamber and the lower liquid chamber in accordance with the up/down movement of the piston 30.

In the engine mount as configured above, the insulator 10 is deformed elastically due to the force (weigh and/or vibration) applied to the core 50 and at the same time the piston 30 is to be moved up/downward so that the hydro liquid and air are to be flowed simultaneously in accordance with volume variations of the upper liquid chamber and the air chamber.

Meanwhile, the piston 30 according to the present invention may be made of elastic material, but in various embodiments of the present invention the piston 30 is made of metal material or synthetic resin in which elastic deformation is not produced, so as to minimize a pumping loss and further is connected to the nozzle plate 20 through the elastic member 31 arranged on a lower end thereof thereby to be moved due to an elastic deformation of the elastic member 31.

Furthermore, in various embodiments of the present invention, the flow channel 21 formed through the nozzle plate 20 is formed in a ring shape along the surrounding of the nozzle plate 20, having an upper hole 22 communicated to the upper liquid chamber and a lower hole communicated to the lower liquid chamber and disposed to be opposite to the upper hole 22 or spaced therefrom wherein the upper hole 22 is disposed to be opposite to the air channel 60, leaving the piston 30 therebetween. That is, the air channel 60 is formed adjacently over the lower hole.

Furthermore, a part of the piston 30 of the present invention is formed to be an oblique surface. That is, an internal height (A: see FIG. 1) from the nozzle plate 20 at one side and an internal height (B: see FIG. 1) at the other side are different each other wherein one part of the piston, having the higher height A, is directed toward the upper liquid chamber and the other part thereof, having the lower height B, is directed toward the air channel 60.

Figure 3:
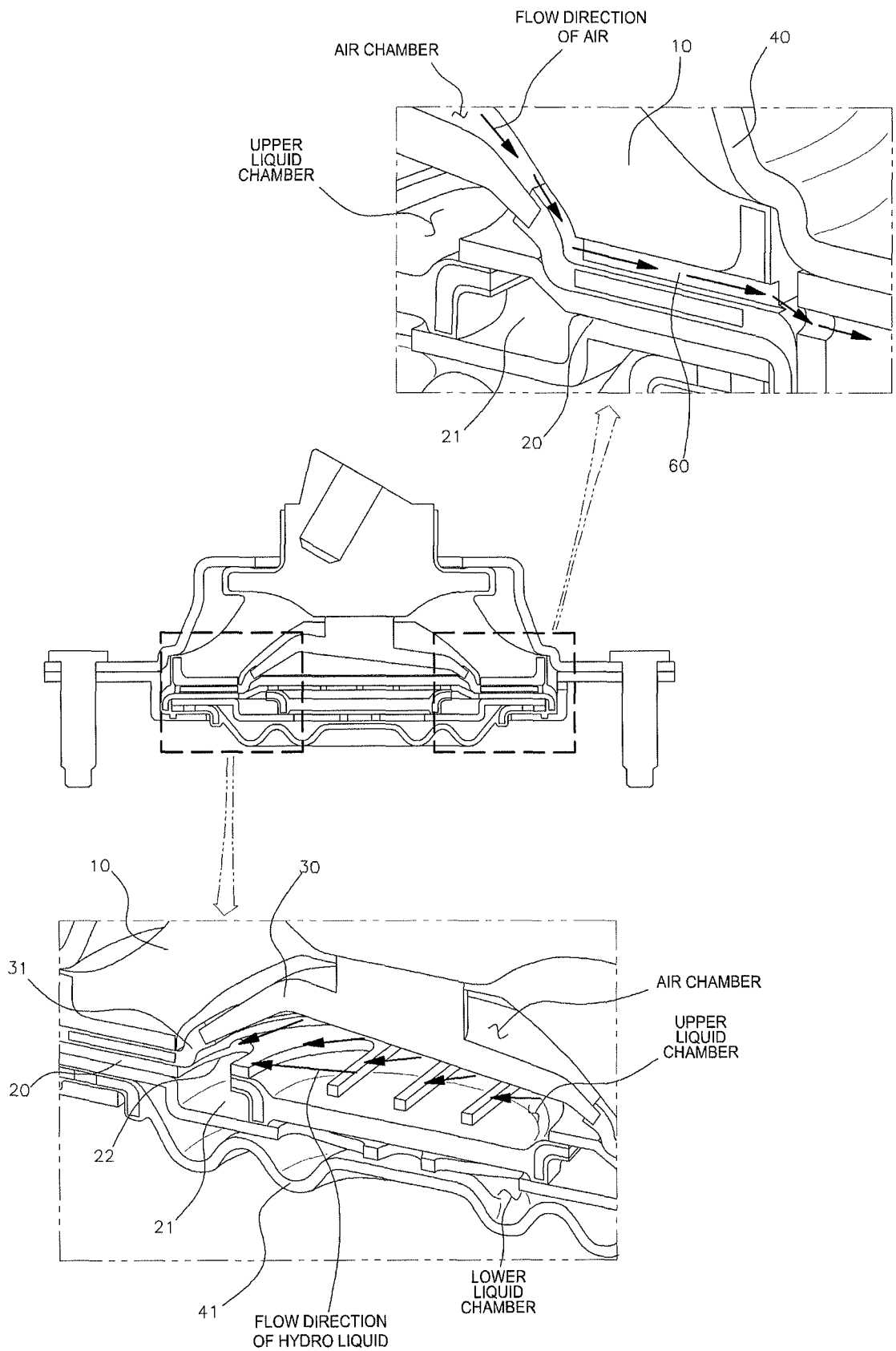
FIG. 3 is a view showing an exemplary engine mount in which air and hydro liquid flow simultaneously according to the present invention.
Figure 4:
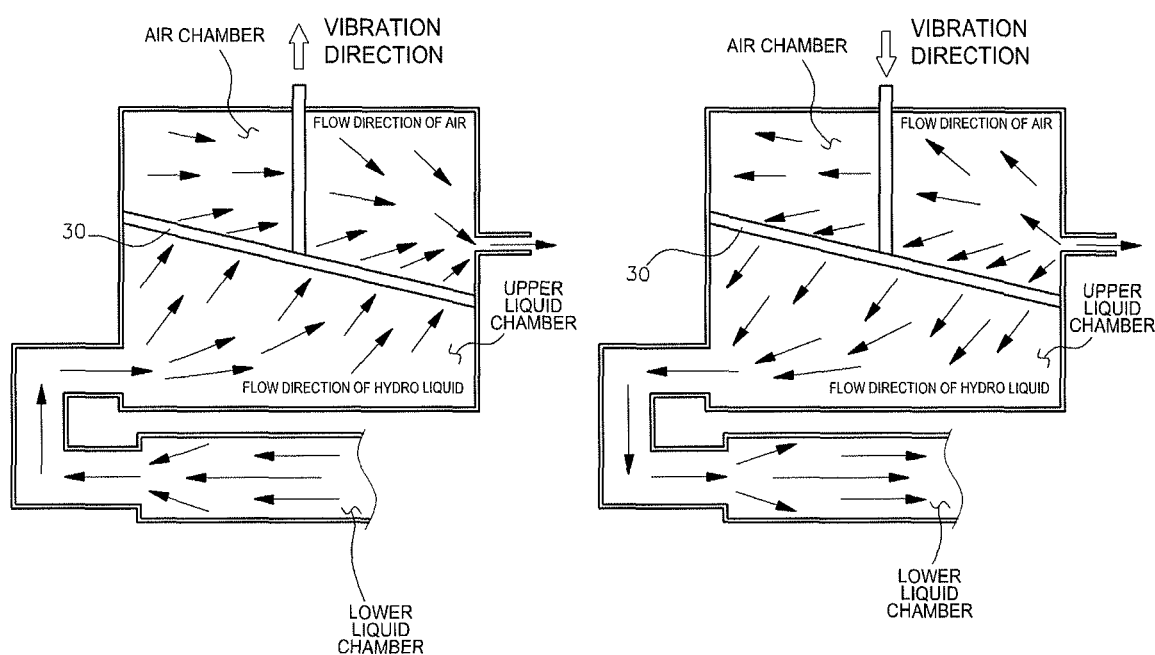
FIG. 4 is a view showing simplified flow directions of air and hydro liquid depending on vibration direction in an exemplary engine mount according to the present invention.

Accordingly, the piston 30 of the present invention is connected directly to the core 50 and is formed to have the oblique surface and as a result when weigh and/or vibration is input on the core 50, it is divided uniformly or at a constant rate into the force to deform elastically the insulator 10 and the force to pump the piston 30, thereby making the hydro liquid and air to be flowed simultaneously, as shown in FIGS. 3 and 4.

That is, the elastic deformation of the insulator 10 produced by the force applied to the core 50 and the up/down movement of the piston 30 are induced almost simultaneously, and thus the damping force produced by the flow of the hydro liquid and the damping force produced by the air pressure (the entry into and exit from the air chamber of air) can be obtained simultaneously without time delay.

Meanwhile, a membrane 23 that is vibrated up/downward may be arranged alternatively on the nozzle plate 20 so as to improve the damping force over a specific frequency region.

In the engine mount as described above, two mount systems of a pneumatic type and a liquid enveloped-type are arranged up/downward in parallel thereby to make the engine mount to be compact.

Further, the piston 30 of the present invention is made of rigid body to minimize the decrease of the damping pressure due to the deformation of the insulator 10. That is, the force transference can be maximized without loss.

According to the engine mount of the present invention, the vibration over a wider frequency region can be dampened more effectively using air and hydro liquid as an operation liquid. That is, the vibration over 10-13 Hz band region that is exhibited while a vehicle drives can be insulated by maximizing the loss coefficient and also the vibration over 5-20 Hz region band due to the air vibration of a tire can be dampened effectively, thereby improving a riding feeling of a vehicle.

Since the piston constituting a boundary between the upper liquid chamber and the air chamber is formed in an oblique plate configuration, the vibration components input from the core is divided uniformly into the air pressure that applies to the air chamber and hydraulic pressure that applies to the upper liquid chamber (or divided into a desired rate depending on a set oblique angle of the piston), thereby improving further damping performance.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine mount containing a hydro liquid, comprising:
   an insulator arranged inside a housing and elastically deformed in accordance with a force applied to a core connected to an upper end thereof;
   a nozzle plate including a flow channel opening upwardly and downwardly through which the hydro liquid flows, the nozzle plate connected between a diaphragm connected to a lower end of the housing and the insulator; and
   a piston arranged to partition an internal space between the insulator and the nozzle plate and connected to the core to move in accordance with the force applied to the core, wherein an upper liquid chamber and a lower liquid chamber through which the enveloped hydro liquid flows are formed between the piston and the nozzle plate, and between the nozzle plate and the diaphragm, respectively, and an air chamber communicating with ambient air through an air channel through which the ambient air can enter and exit is formed between the piston and the insulator.

2. The engine mount of claim 1, wherein the piston is connected to the nozzle plate through an elastic member arranged on a lower end thereof and is moved in accordance with elastic deformation of the elastic member.

3. The engine mount of claim 1, wherein the flow channel is formed in a ring shape along a surrounding of the nozzle plate, and includes an upper hole communicating with the upper liquid chamber and a lower hole communicating with the lower liquid chamber wherein the upper hole opposes the air channel, leaving the piston therebetween.

4. The engine mount of claim 3, wherein the piston includes an oblique surface wherein internal heights from the nozzle plate are different at one side and another side, and one part of the piston, having a higher height, is arranged to be directed toward the upper liquid chamber and another part of the piston, having a lower height, is arranged to be directed toward the air channel.

5. The engine mount of claim 4, wherein a membrane vibrated in accordance with the flow of the hydro liquid is arranged on the nozzle plate.

* * * * *